UNITED STATES PATENT OFFICE.

PAUL KRAIS, OF TÜBINGEN-LUSTNAU, GERMANY, ASSIGNOR TO MAX PETZOLD, OF ZITTAU, GERMANY.

PROCESS OF PURIFYING WASTE MERCERIZATION-LYES.

1,035,882. Specification of Letters Patent. Patented Aug. 20, 1912.

No Drawing. Application filed July 24, 1911. Serial No. 640,325.

*To all whom it may concern:*

Be it known that I, PAUL KRAIS, a subject of the German Emperor, and residing at Tübingen-Lustnau, Germany, have invented a certain new and useful Improved Process of Purifying Waste Mercerization-Lyes, of which the following is a specification.

The subject-matter of my present invention is a modification of the process for purifying the soda-lye rendered impure by the mercerization process according to the Letters Patent 967272, Otto Venter, of Aug. 9, 1910.

According to my invention the waste lye containing size is now treated with a mixture of lime and clay, and an agent for effecting flocculence may be added to the reaction-mass.

The new purifying process can be carried out without the addition of soda.

This process is an improvement of the method described in the said patent inasmuch as, firstly, a smaller quantity of insoluble substances is to be added to the soda-lye so that accordingly a smaller reaction-mass is to be used up, and secondly, it does not depend on an addition of soda, so that when the conditions of the mercerization process necessitate this, only so much waste lye or caustic soda is purified as has been recovered from the mercerized goods. On the other hand, however, without impairing the process so much soda and quick lime can be added, or separately boiled to form soda-lye or, finally, so much solid or dissolved caustic soda can be added as is required as a substitute for the lost caustic soda or for the lye used up for other purposes.

My new process is based on the observation that by adding clay to the reaction-mass a mechanical or mechanical-chemical combination of the clay with the size contained in the waste lye is presumably formed. The quantity of lime necessary for removing the size can be reduced to a considerable extent. Preferably clay dried in the air is employed in the form of powder, which is as little soluble as possible in soda-lye. By means of this addition of clay it is, for example, possible successfully to remove the size to such an extent from waste lye, which required for 5000 liters 620 kilos quick-lime and 150 kilos soda (when consequently if 120 kilos quick-lime be reckoned for the caustification of the soda 500 kilos quick-lime was necessary for the removal of the size) by an addition of 125 kilos clay and 125 kilos quick-lime, that the purified lye can be boiled down and gives the full mercerization effect on being used again. Consequently instead of 500 only 250 kilos solid matter is added. The added clay acts, however, at a temperature far below the boiling point. In many instances the purifying operation can be satisfactorily performed even at the temperature at which the waste lye comes from the mercerizing machine, that is at say 30 to 50° Celsius, so that a further saving in time and expense is effected.

In practice it has proved advisable to add to the lye to be regenerated a small quantity of an agent for producing flocculence, the extremely fine precipitate which is often difficult to filter assuming a flocculent form, becoming entirely deposited and being much more easy to filter. A soluble lead salt, for example, sugar of lead, is preferably employed as such an agent, said sugar of lead dissolved in water being stirred into the mixture, whereupon a kind of coagulation of the sediment immediately occurs. Whereas, however, it is necessary to be extremely careful with this admixture when lime alone (or lime and soda) is used, because otherwise lead, probably as sodium plumbate, goes into solution and passes also into the mercerization process, whereby during the subsequent dyeing operation disturbances readily occur, it is possible in the case of the new process to use the sugar of lead admixture without injury up to 2 to 2.5 kilos per 5000 liters waste lye, a quantity which corresponds with the maximum flocculence effect.

It may be mentioned by way of example that to 5000 kg. of waste-lye of 10° Baumé containing size, dextrin and other impurities, 125 kg. of pulverized clay dried in the air and 125 kg. of caustic lime are added, whereafter the whole is during one hour heated in stirring up to 50° Celsius, 2 kg. of sugar of lead dissolved in 10 kg. hot water are then added. The size and the impurities of the water-lye form with the clay and the caustic lime a mechanical-chemical composition, which by the addition of sugar of lead is precipitated in a flocculent form which is to be removed by filtration.

I claim:—

1. The process of purifying waste-mercerization-lye consisting in heating the lye, in adding thereto a quantity of lime and pulverized clay whereby a sediment is obtained and in removing the sediment.

2. The process of purifying waste-mercerization-lye consisting in heating the lye, in adding thereto a quantity of lime and pulverized clay, in mixing an agent for producing flocculence therewith whereby a flocculent sediment is obtained and in removing the sediment.

3. The process of purifying waste-mercerization-lye consisting in heating the soda-lye, in adding a mixture of lime and clay to the soda-lye, in mixing sugar of lead therewith, whereby a flocculent sediment is obtained and in removing the sediment by filtration.

In testimony whereof, I affix my signature in the presence of two witnesses.

PAUL KRAIS.

Witnesses:
PAULINE KLAIBER,
ERNEST ENTENMANN.